Figure 8:
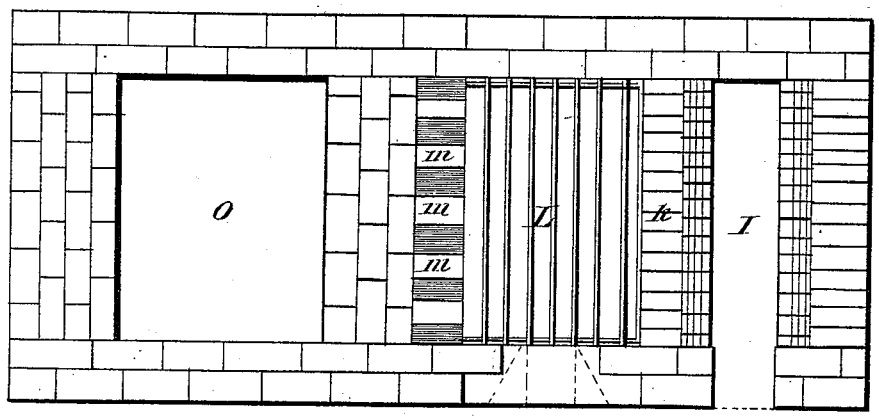

(No Model.) 3 Sheets—Sheet 1.
J. J. STORER.
FURNACE FOR TREATING REFUSE OF CITIES.
No. 518,285. Patented Apr. 17, 1894.
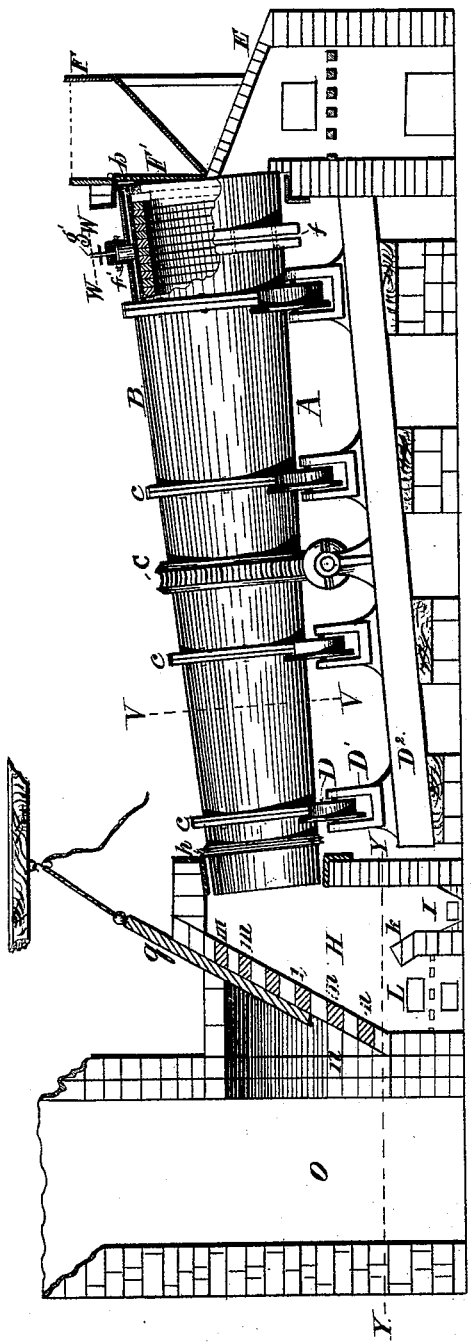
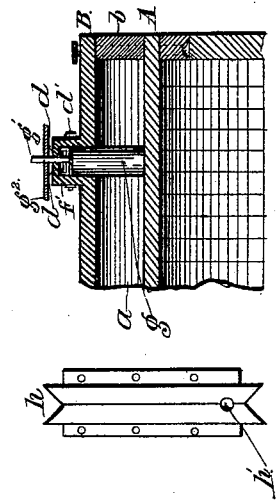
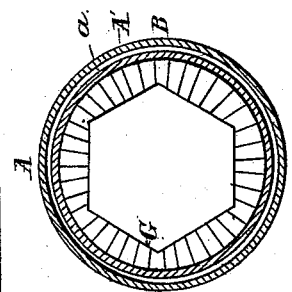
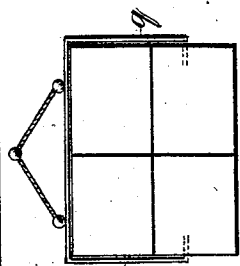
Witnesses
James F. Auster
John H. Hibbard
Inventor
Jacob J. Storer

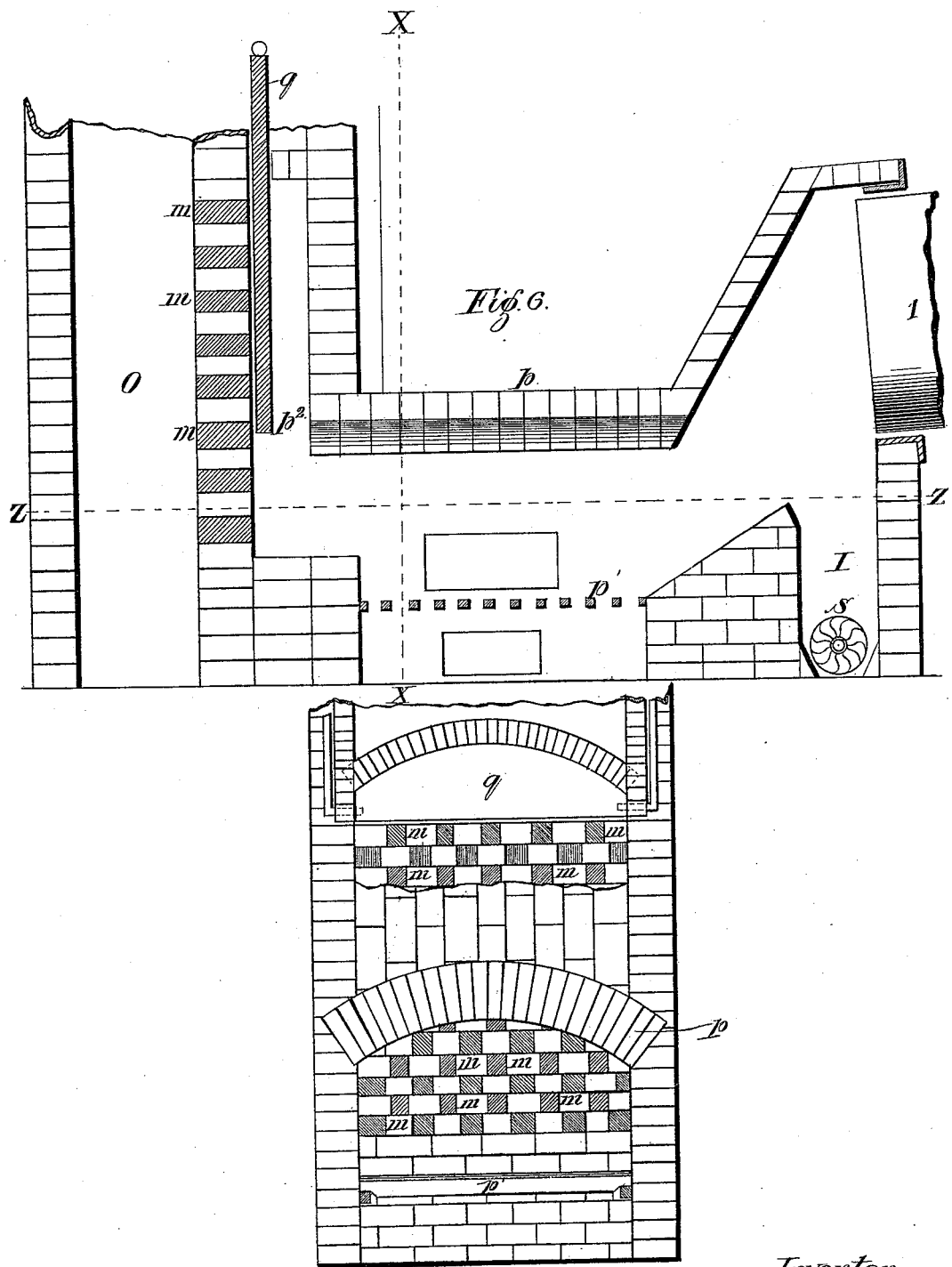

(No Model.) 3 Sheets—Sheet 3.

J. J. STORER.
FURNACE FOR TREATING REFUSE OF CITIES.

No. 518,285. Patented Apr. 17, 1894.

UNITED STATES PATENT OFFICE.

JACOB J. STORER, OF HELENA, MONTANA, ASSIGNOR, BY MESNE ASSIGNMENTS, TO THE ECONOMIC-SANITARY COMPANY, OF MONTANA.

FURNACE FOR TREATING REFUSE OF CITIES.

SPECIFICATION forming part of Letters Patent No. 518,285, dated April 17, 1894.

Application filed March 19, 1892. Serial No. 425,646. (No model.)

*To all whom it may concern:*

Be it known that I, JACOB J. STORER, of Helena, county of Lewis and Clarke, and State of Montana, have invented certain new and useful Improvements in Furnaces and Apparatus for Treating the Refuse of Cities, of which the following is a full, clear, and exact description, reference being had to the accompanying drawings, and to the letters of reference marked thereon.

In my application for United States patent for improved "Furnace and apparatus for treating the refuse of cities," filed March 18, 1891, Serial No. 385,500, I show and describe a revolving cylinder furnace of equal diameter from one end to the other.

In my system of treating the refuse of cities it is designed that the garbage be rapidly and continuously fed into a revolving furnace set at such an inclination and revolved at such speed that the garbage will remain, say from ten to fifteen minutes, subjected to the influence of the hot air and flame in the cylinder before being discharged, desiccated or cremated, from the lower end thereof. Hence when operating under these conditions, in a cylinder furnace of equal diameter throughout its length, there will, at all times, be several tons of garbage in the furnace, the greater portion of it, green or wet and bulky, occupying nearly the upper third of the furnace length, and about one third of its diameter, while near the discharge end the garbage, greatly reduced in bulk by drying, and occupying but little room along the lower segment of the furnace, leaves a large and unnecessary space above for the too free exit of the hot air and gases, which, keeping at the upper side of the furnace, fail to be as useful as they might be, for these heated gases and flame should, for the sake of economy, be kept as much as possible in contact with the furnace contents, and thereby be to a greater extent utilized in desiccating or cre-mating them.

My present improvement is designed not only to accomplish this result, but to introduce other economies and novel devices into the system and process of disposing of the refuse of cities.

My improvements embrace a new form of revolving furnace, which I now make conical,—in the shape of a frustum of a cone,—the smaller end being the discharging end,—so that the hot air and gases are better kept down in contact with the furnace contents.

The invention also embraces an improved form of furnace lining, which is now made angular,—quadrangular, hexagonal or octagonal,—in cross section, so that when the furnace is in operation the contents thereof are more thoroughly agitated to present or expose fresh surfaces incessantly to the influence of the hot air and gases.

The invention further embraces an improvement for effecting the deodorization, by combustion or decomposition by heat, of the offensive gases escaping from the garbage being cremated; and simple and improved devices for disposing of the contents of the furnace as they are discharged; and an auxiliary device for better assuring the constant contact of the flame and hot gases with the furnace contents; a device for preventing the excessive admission of air into the head of the furnace, and, at the same time, the escape or puffing of flame and gases at that point; and an improved device for keeping the furnace shell cool: all of which will be hereinafter fully set forth.

Reference is to be had to the accompanying drawings, forming a part of this specification, in which similar letters of reference indicate corresponding parts in all the figures.

Figure 9:
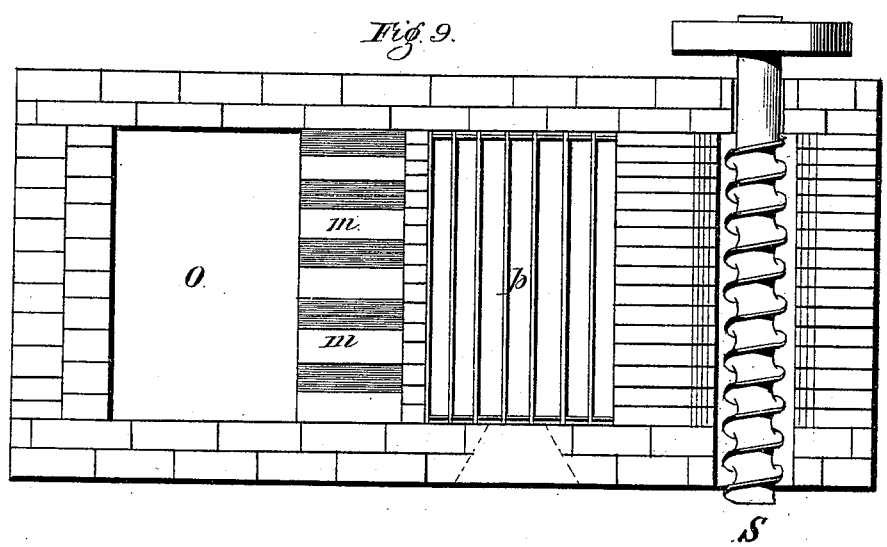

Figure 1, is a partly sectional side elevation, with parts broken away to better exhibit other parts, showing my improved revolving, conical furnace and attachments in position. Fig. 2, is a front elevation of the damper for controlling the escape of the gases from the gas combustion chamber, and retaining them longer in the furnace when desirable. Fig. 3, is an enlarged cross section of the furnace on line V V. Fig. 1. Fig. 4, is an enlarged front elevation of the annular conductor for the flow of water from the furnace water jacket. Fig. 5, is an enlarged sectional elevation on line W W. Fig. 1. Fig. 6, is an enlarged sectional elevation showing another form of gas-combustion chamber. Fig. 7, is a sectional elevation on line X X. Fig. 6 looking toward the smoke stack. Fig. 8, is an enlarged plan view on line Y Y. Fig. 1. Fig. 9, is an enlarged plan view on line Z Z. Fig. 6.

My improved conical furnace A, is constructed preferably of an inner shell A', and an outer shell B, with a space $a$ between them for water to form a water jacket for preventing undue expansion of the shell A, when the furnace is in operation. The ends of the space $a$ are closed with rings $b$, to which the shell ends are fastened, as best shown in Fig. 5. The outer shell is preferably made in sections flanged at their ends as shown at $c$ and bolted together. The two sections forming the larger end of the outer shell B, have their opposing flanges shaped as best shown in Fig. 5,—the main bodies of the flanges being at right angles to the shell, and having right angled offsets $d$ approaching each other. By suitable bolts and nuts $d'$ these sections are held in position, so that a narrow, annular space $f$ is left between the flange offsets, to allow the revolution of the cylinder without affecting the pipe $g'$, and a wider space $f'$ between the flanges themselves. A flat iron ring $g$, nearly as wide as the space $f'$ and of like diameter, is fitted therein, as best shown in Fig. 5, and through it and extending out through the annular space $f$ is secured a strong tube or pipe $g'$ provided with a collar $g^2$ which is designed to be bolted to a timber (not shown) so that the ring $g$ shall be held immovable when the furnace revolves. The contact faces of the said ring $g$ and of the flange offsets being properly fitted and lubricated a water-tight joint is there formed.

From a hose (not shown) attached to the free end of the pipe $g'$ a continuous supply of water may be delivered into the space between the inner and outer shells of the furnace, and a continuous outflow is secured therefrom through a suitable opening (not shown) in the lower end of the outer shell, and at this point a flanged, V-shaped ring $h$ is secured about the shell B, with its orifice $h'$ coinciding with the water-discharge opening (not shown) of said shell, so that the water issuing from the water jacket will flow into the V-shaped groove of the ring $h$, and be delivered always from the lowest point thereof.

When desirable suitable cocks or other devices for regulating the supply and discharge of water into and from the water jacket may be applied.

The water jacket may be dispensed with, in which case the inner shell may be constructed in flanged, conical sections.

The furnace may be revolved by means of belt, chain or spur gear, but preferably by worm gear as indicated at C, and it is supported in position, on an inclination of say about an inch to a foot, so as to revolve with but slight friction, by flanged wheels D, fixed in suitable standards D' on the supporting frame D² and bearing against the peripheries of the furnace flanges $c$.

At the feed end of the furnace is the fireplace E, above which is fixed a hopper F, through which the refuse matter to be cremated is fed into the furnace as the latter revolves; and closing the throat of this hopper is a hanging door F' that is arranged to freely swing inward, into the head of the furnace, under pressure of material sliding down the hopper into the furnace, and then by gravity to return to its normal, vertical position, as shown, closing the hopper throat to prevent the admission there of air into the furnace, and at the same time to prevent escape of flame or gases from the furnace head. The extent or area of the opening of this door will be governed, it will be seen, by the bulk and not by the weight of the mass of material sliding down the hopper against it, so that a small mass, however heavy, will open it but little, while a bulky mass, however light, will open it sufficiently for its passage into the furnace; the opening of the door being in each case just enough to admit the mass of material without excess of air.

The inner face of the brick lining G, as best shown in Fig. 3, is made angular, in a series of longitudinal shelves, to insure the better agitation, by lifting and dropping, of the contents of the furnace when the latter is in operation.

The lower or exit end of the furnace projects into the gas-combustion chamber H, in the bottom of which is a pit I, for receiving the material continuously discharged from the furnace, whence it may be continuously or intermittently removed through the door $i$; and separated from the pit by a wall $k$ is a fire place L, for carrying a fire for furnishing auxiliary heat to keep the chamber H, at a sufficiently high temperature. The inclined chamber wall $l$ opposite the end of the furnace has many openings $m$, sufficient in the aggregate to permit free passage of the furnace gases to the smoke stack O, and said wall at the same time somewhat retards the passage of the gases from the chamber to the stack so that they may be for a while held subject to the hot air and flame from the fire place and to the heat from the surrounding brick work, in order that they may be thereby decomposed and deodorized. This wall $l$ being placed on a slope or inclination, as shown, becomes more quickly and evenly heated throughout than if it were vertical, and when heated radiates heat upon the mingled air and gases in the chamber H. Between it and the smoke stack is a connecting flue $n$, furnishing a sometimes desirable, additional space for the mingling of the gases and hot air, assuring consequently a more complete combustion of the former before their entrance into the stack; and by means of a damper $q$, arranged to slide up and down on the outer face of the wall $l$, to open or close apertures $m$ the draft through the furnace can be retarded or quickened, and the time of the retention of the furnace gases under the influence of the heat in the combustion chamber can be regulated and the currents of gases, when their volume is not sufficient to fill the chamber H, are thereby kept down in contact with the cylinder contents, and, in escaping, pass through and part with heat only to the lower portion of the wall $l$, and do not have their temperature too much lowered by contact with the whole surface thereof.

In Figs. 6, 7 and 9 is shown another form of gas-combustion chamber, containing or consisting partly of a reverberatory furnace, of which the roof is shown at $p$, the grate bars at $p'$, and the flue, which is in effect part of the said chamber, at $p^2$; and that portion of the wall of the smoke stack O, which forms one side of the flue $p^2$, has openings $m$ in it sufficient, in combined area, for the free passage of the furnace gases into the stack; and a damper $q$, arranged to slide up and down this perforated wall, serves to regulate the furnace draft. This arrangement of the perforated wall, although good for some classes of materials is not as good for all the forms of refuse that have to be cremated as the arrangement shown in Fig. 1, in which the perforated wall is outside of the chimney and directly in the range of the heated gases as they issue from the cylinder, whereby the wall becomes intensely heated and the gases are therefore more thoroughly consumed.

In the pit I, of the combustion chamber shown in Figs. 6 and 9, is a screw conveyer S, for continuously removing from said pit the cremated material falling therein from the discharge end of the revolving furnace.

The gas combustion chambers, the pits for receiving the cremated contents of the furnace and the devices for removing the pit contents are much more simple and economical in construction and operation than those shown and described in my application above referred to.

Having thus described my invention, I claim as new and desire to secure by Letters Patent—

1. In a furnace, the combination of a revolving cylinder, a fire-place at the receiving end thereof, and a chimney at the other end, with a gas combustion chamber located outside of the chimney, and a perforated wall facing the discharge end of the cylinder and arranged between it and the chimney, substantially as described.

2. In a revolving cylinder furnace, the combination with the inner shell A. of an outer shell B., having flanged sections with opposing flanged offsets $d$., immovable ring $g$, with inserted water-pipe $g'$, and end rings $b$, the whole being fitted and arranged and operating substantially as herein shown and described, and forming a water jacket or space for the purpose set forth.

3. In a water-jacketed, revolving furnace, the combination with the outer shell provided with a water-discharge opening, of a grooved ring encircling said shell and having an orifice coinciding with the discharge opening thereof, constructed and arranged substantially as and for the purpose described.

4. In a furnace adapted for the cremation of city refuse, the combination with a perforated wall arranged between the furnace and the stack thereof, of an imperforate damper arranged to open the perforations successively from the bottom upward, substantially as described.

5. The combination with a furnace adapted for the cremation of city refuse of a gas combustion chamber, at and about the discharge end thereof, constructed with a perforated front wall; a pit in the bottom of said chamber for the reception of the discharged contents of the furnace; a fire place between said pit and the smoke stack, and a flue for the passage of the gases into said stack; all located, constructed and arranged substantially as set forth.

6. In a system designed for the cremation of city refuse, the combination with a revolving furnace of a fireplace at the receiving end thereof; a feed hopper provided with a gravity-operating door; a gas combustion chamber having one wall perforated for the passage of the furnace gases into the stack; a receiving pit and fire place in said chamber, and a flue between it and the stack: the parts being constructed, arranged and located relatively to each other, as herein shown, and for the purposes set forth.

In testimony that I claim the foregoing I have hereunto set my hand, in the presence of two witnesses, this 14th day of March, 1892.

JACOB J. STORER.

Witnesses:
J. F. CLUSTER,
JOHN H. HIBBARD.